United States Patent [19]

Lehmann

[11] Patent Number: 4,474,076
[45] Date of Patent: Oct. 2, 1984

[54] DEVICE FOR BALANCING ROTATION BODIES

[75] Inventor: Heinz Lehmann, Bettlach, Switzerland

[73] Assignee: Meyer AG Zurchwil, Zurchwil, Switzerland

[21] Appl. No.: 294,000

[22] Filed: Aug. 18, 1981

[30] Foreign Application Priority Data

Aug. 29, 1980 [EP] European Pat. Off. ........ 80810267.7

[51] Int. Cl.$^3$ ............................................. F16F 15/22
[52] U.S. Cl. .................... 74/573 R; 51/169; 73/458
[58] Field of Search .............. 74/573; 51/169; 73/458, 73/470

[56] References Cited

U.S. PATENT DOCUMENTS

| 3,177,738 | 4/1965 | Achilles | 74/573 |
| 3,376,759 | 4/1968 | Helo | 74/573 |
| 3,918,326 | 11/1975 | Kloa et al. | 74/573 |

FOREIGN PATENT DOCUMENTS

| 264161 | 8/1968 | Austria | 51/169 |
| 741078 | 8/1966 | Canada | 73/458 |
| 1135207 | 8/1962 | Fed. Rep. of Germany | 74/573 |
| 1218754 | 6/1966 | Fed. Rep. of Germany | 74/573 |
| 1272585 | 7/1968 | Fed. Rep. of Germany | |
| 2148832 | 6/1978 | Fed. Rep. of Germany | |
| 537014 | 6/1973 | Switzerland | |
| 591311 | 9/1977 | Switzerland | 51/169 |
| 1203244 | 8/1970 | United Kingdom | |
| 506774 | 6/1976 | U.S.S.R. | 51/169 |

Primary Examiner—Gary L. Smith
Assistant Examiner—Anthony W. Raskob
Attorney, Agent, or Firm—Wender, Murase & White

[57] ABSTRACT

A device for balancing rotating bodies comprising two inertia masses, which are disposed in a cylindrical housing which can be connected to the body to be balanced such as a grinding disc, and which are mutually connected by means of a self-locking worm gear. The inertia masses may be displaced by means of one single switch shaft having four positions in which the two inertia masses can be displaced either countercurrently in both directions or concurrently. When braking is effected by means of a brake knob disposed on the switch shaft, displacement occurs until the indicated imbalance lies within the low, desirable range. The worm shaft and the worm wheel contained in the inertia masses are in engagement with the worm gear of the switch shaft and the housing.

An arrangement of this type permits, on the one hand, a simple mechanical construction and operation, and, on the other hand, a large inertia mass, relative to the volume available, with a wide range of adjustment.

13 Claims, 3 Drawing Figures

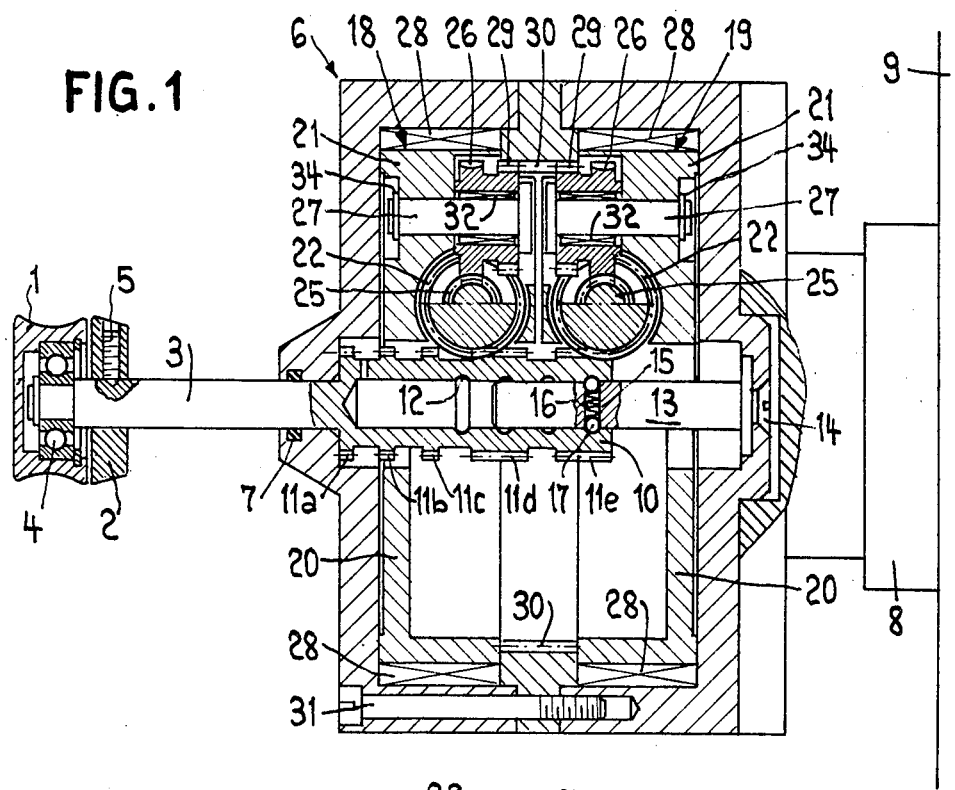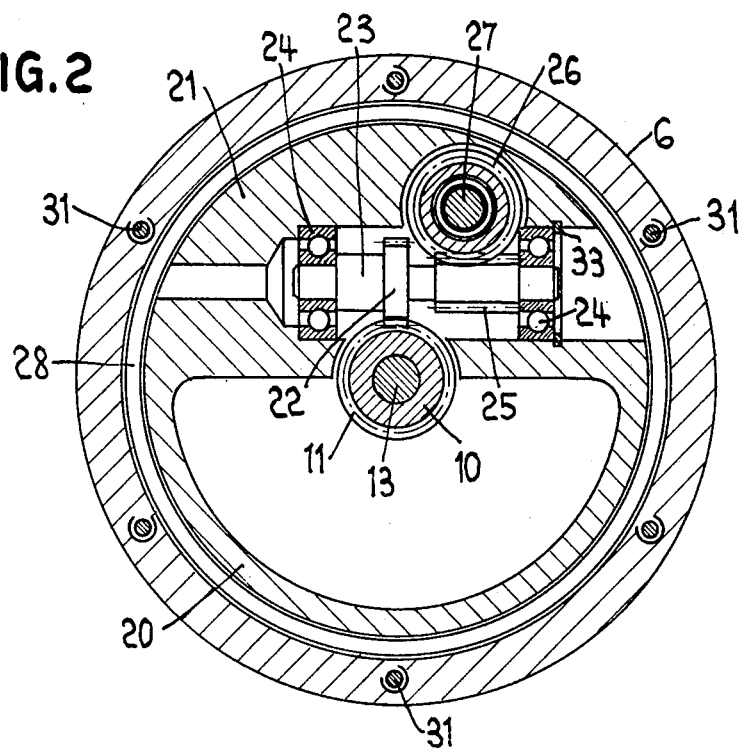

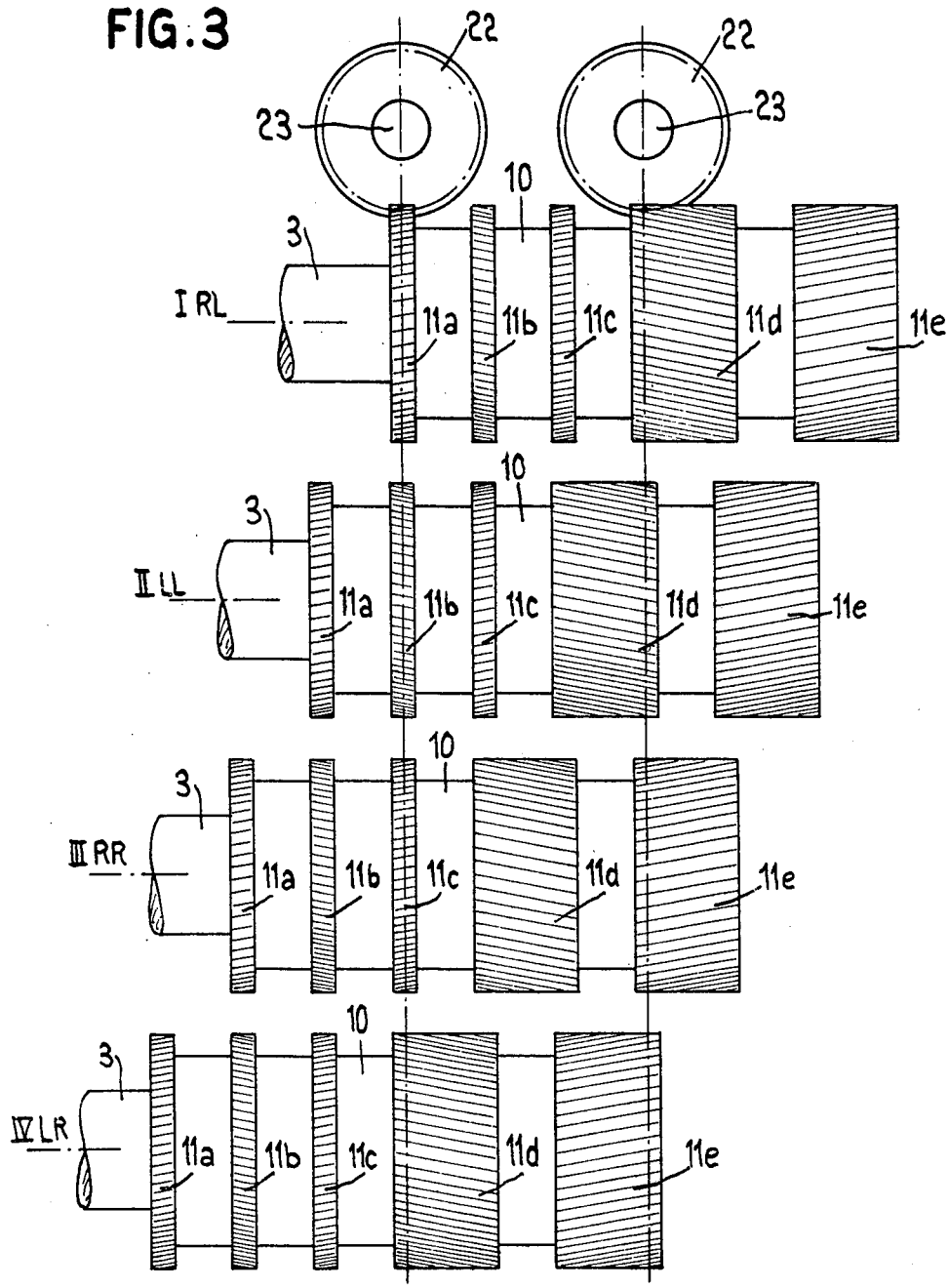

DEVICE FOR BALANCING ROTATION BODIES

BACKGROUND OF THE INVENTION

The present invention relates to a device for balancing rotating bodies which are mounted on a shaft, especially grinding discs, by means of rotating inertia masses whose centre of gravity is adjustable relative to the body to be balanced.

According to Swiss Pat. No. 537 014, for example, it is possible to adjust each inertia mass in an automatic operation by means of an electric motor. Whilst the adjustment by means of electric motors has the advantage of being able to use a maximum inertia mass for the space available, the electric motor is relatively expensive and, above all, necessitates the use of slip rings disposed at the front end.

On the other hand, it is known to adjust the inertia masses by means of mechanical adjusting drives which are, however, susceptible to trouble and are very expensive. In addition, the mechanical adjusting drives require a relatively large amount of space which is then no longer available for the inertia mass. A balancing device is additionally known, therefore, in which the masses are balanced by the alternate actuation of two control knobs which require two adjusting mechanisms and therefore a relatively large amount of space.

By comparison, the object of the present invention is to provide a balancing device which comprises mechanical adjusting drives which on the one hand, have a very simple construction and, on the other hand, contain a large balancing mass relative to the space available.

SUMMARY OF THE INVENTION

According to the present invention there is provided a device for balancing rotating bodies which are mounted on a shaft, more especially grinding discs, by means of rotating inertia masses whose centre of gravity is adjustable relative to the body to be balanced, comprising two inertia masses which are adjustable by means of a single switch shaft, the switch shaft and the inertia masses being engaged one with the other by means of a self-locking worm gear arrangement.

BRIEF DESCRIPTION OF THE DRAWINGS

The present invention will be described further, by way of example, with reference to the accompanying drawings, in which:

FIG. 1 is a longitudinal section through a balancing device according to the invention;

FIG. 2 is a cross-section through the device of FIG. 1; and

FIG. 3 shows the four positions of the switchgear of the device shown in FIG. 1.

DETAILED DESCRIPTION

FIG. 1 shows, from left to right, a switch handle 1 and a brake knob 2 which are located on a switch shaft 3. The switch handle 1 is mounted on the switch shaft 3 by means of a ball bearing 4, whilst the brake knob 2 is connected to the switch shaft 3 by means of a securing screw 5. The switch shaft 3 is slidably disposed in a housing 6 and sealing mounted in the housing 6 by means of an O-ring 7. The housing 6 is securely connected to a grinding disc 9 to be balanced, by means of a flange 8. Mounted on the end of the switch shaft 3 is a worm shaft 10 which, see FIG. 3, comprises five worms 11a, b, c, d and e, each having different thicknesses and directions of rotation. The worm shaft 10 is hollow, and has four encircling notched grooves 12 in its bore, which slides over a guide shaft 13, which is secured on the housing 6 by means of a countersunk screw 14. The guide shaft 13 has a transverse bore 15 at one location, with engaging means being provided in this bore 15, which engaging means comprises a spring 16 and two balls 17, which both engage in one of the four notched grooves 12 during the displacement of the switch shaft 13. The four positions shown in FIG. 3 are therefore clearly determined.

The worm shaft 10 engages with two inertia masses 18 and 19 which each comprise a cylinder wall 20, a fillmass 21 and a gear arrangement. As can be seen especially from FIG. 2, one of the worms of the first worm shaft 10 is in engagement with a toothed wheel 22 on a second worm shaft 23 which is guided by two ball bearings 24 and secured by a Seeger circlip 33. The worm shaft 23 comprises a worm 25 which is in engagement with a worm wheel 26. This worm wheel 26 is mounted on the axle 27 by means of a needle bearing 32, said axle 27 being mounted on the fillmass 21 by Seeger circlips 34. It can also be seen from FIG. 2 that the inertia mass, which is available for the balancing of the masses, results from the difference between the one half of the cylinder wall, at the bottom of FIG. 2, and the upper half comprising the worm shaft 23, the worm wheel 25 with the axle 27, and the fillmass 21. It is possible to set this difference accurately by determination of the thickness of the wall 20 of the lower half of each cylinder 18, 19. The inertia mass cylinders 18 and 19 are each mounted, by a needle bearing 28, in the housing 6. The worm wheel 26 is in engagement with a toothed ring 30, positioned in the centre of the housing, by way of an inner toothed ring 29, so that the rotation of the grinding disc to be balanced by way of the housing 6, toothed ring 30, inner toothed ring 29, worm wheel 26 and second worm shaft 23 via toothed wheel 22, is transmitted to the first worm shaft 10 and thus to the switch shaft 3. In this case it should be emphasized that the worm gears operate in a self-locking manner.

To complete the balancing device, a vibration sensor (not shown) is included, plus an electronic device, which is associated therewith and is also not shown, having an indicator to show the extent of the imbalance. The indicating panel is generally subdivided into a green indicating zone and a red indicating zone, the balancing process being terminated if the indicating needle moves into the green zone.

In order to balance, for example, a grinding disc 9, the housing 6 of the balancing device is connected, via its flange 8, to the grinding disc 9, the electronic device is switched on and the disc is brought to working speed. In order to effect balancing, the switch shaft 3 is brought, by means of the switch handle 1, into one of the four positions shown in FIG. 3 and braked by means of the brake knob 2, whereby, viewed from top to bottom; in Position I the out-of-balance masses 18, 19 are displaced countercurrently right-left, RL; in Position II the out-of-balance masses are displaced concurrently to the left, LL; in Position III the out-of-balance masses are displaced concurrently to the right, RR; and in Position IV the out-of-balance masses are displaced countercurrently left-right, LR. The two extreme positions I and IV therefore correspond to a coarse adjustment, and the two inner positions II and III correspond to a fine adjustment. Thus, the four directions of rotation of the two masses 18,19 result from the direction of rotation, left or right, of the worms, from the thickness of the worms and from their spacing one from the other. The adjustment itself, i.e. the adjustment of the inertia masses, or the second worm shaft relative to the first worm shaft, is effected by braking the switch shaft 3, by means of the brake knob 2 which otherwise rotates at the same speed as the grinding disc 9, whilst the displacement of the switch shaft 3 into the four positions I to IV is effected by the ball-bearing-mounted switch handle 1. In this case the inertia masses 18, 19 are displaced very slowly as a result of the sharp reduction in speed caused by the worm gears, e.g. 1:2500, whereby a fine balancing is possible. For first-time balancing, balancing will initially be effected in the first position in order to ascertain the direction in which the needle swings. If the needle moves more intensely into the red zone, a counterbalance will be effected in the fourth position and subsequently in Positions II or III. It will generally be necessary for a cycle to be repeated one or more times until the needle remains in the green zone. For slight, subsequent adjustment as the grinding disc is worn down, an adjustment in Positions II and III will generally suffice. Balancing with a device of this type is very easy and can be effected within a very short time.

I claim:

1. A device for balancing a rotating body which is mounted on a shaft, wherein the balancing is accomplished by means of rotating inertia masses whose center of gravity is adjustable relative to the body to be balanced, which comprises
    a single switch shaft having a first end and a second end, a longitudinal axis, and a plurality of worm means disposed at predetermined longitudinally spaced positions along the length thereof, each of said worm means having gear sectors disposed at preselected angles relative to said longitudinal axis;
    a housing securely connectable to the body to be balanced, said housing having a longitudinal bore for slidably and rotatably receiving at least that portion of said switch shaft containing said worm means, said housing further comprising a hollowed-out portion for receiving inertia masses and for defining an inner wall means;
    first and second inertia masses disposed within said hollowed-out portion of said housing; and
    corresponding transmission gear means contained within each of said inertia masses, said transmission gear means cooperating with said inner wall means of said housing and said gear sector means on said switch shaft worm means to adjust the center of gravity of said inertia masses relative to the body to be balanced in response to a longitudinal sliding displacement and rotation of said switch shaft relative to said housing.

2. A device according to claim 1, wherein each of said transmission gear means includes a first worm shaft having a first toothed worm wheel in cooperating engagement with said gear sectors of a preselected one of said worm means on said switch shaft, and a second worm shaft having a second toothed worm wheel in motion transmitting engagement with said first worm shaft and with said inner wall means of said housing.

3. A device according to claim 1, wherein a toothed ring means is securely disposed on said inner wall means of said housing for cooperating engagement with said transmission gear means contained within said inertia masses.

4. A device according to claim 3, wherein said inertia masses each comprise a hollow cylinder containing, in substantially one half thereof, a fillmass and said second worm shaft.

5. A device according to claim 3 or 4, wherein said switch shaft contains five worm means of different longitudinal thicknesses and directions of rotation, said worm means being disposed toward said first end of said switch shaft, and handle means connected to said second end of said switch shaft for facilitating sliding displacement of said switch shaft relative to said housing so as to selectively engage said corresponding transmission gear means with a preselected pair of said five worm means.

6. A device according to claim 4, further comprising brake means mounted to said switch shaft for braking the rotation of said switch shaft relative to the rotation of said housing.

7. A device according to claim 1, wherein said switch shaft comprises a longitudinal bore in the portion thereof on which said worm means are disposed, and further comprising a guide shaft disposed within said bore of said switch shaft, said guide shaft being securely mounted to said housing.

8. A device according to claim 7, wherein said switch shaft is selectively and lockably displaceable into one of four preselected longitudinal positions relative to said housing such that when said switch shaft is braked and is in the first of said four positions said first and second inertia masses are displaceable countercurrently relative to said housing with said first inertia mass moving in a first direction about said longitudinal axis, such that when said switch shaft is braked and is in the second of said four positions said first and second inertia masses are displaceable concurrently with said first inertia mass moving in a second direction which is opposite to said first direction, such that when said switch shaft is braked and is in the third of said four positions said first and second inertia masses are displaceable concurrently with said first inertia mass moving in said first direction, and such that when said switch shaft is braked and is in the fourth of said four positions said first and second inertia masses are displaceable countercurrently with said first inertia mass moving in said second direction.

9. A device according to claim 8, further comprising four encircling notched grooves provided in said bore of said switch shaft, and engaging means disposed on said guide shaft, said engaging means cooperating with said grooves for locking said shaft at a preselected longitudinal displacement relative to said housing.

10. A device according to claim 3, wherein said housing comprises a generally cylindrical configuration having a longitudinal axis which is substantially coincident with said longitudinal axis of said switch shaft, and having a first end thereof mountable to the body to be balanced, a second end thereof longitudinally remote from said first end such that said worm means are disposed between said first and second ends of said housing, and a center portion disposed between said first and second ends, said tooth ring means being securely disposed on said inner wall means of said housing at said center portion thereof.

11. A device according to claim 2, wherein said second toothed worm wheel comprises two separate longitudinally spaced toothed sections, and wherein a toothed ring means is securely disposed on said inner wall means of said housing such that a first of said spaced toothed sections engages said toothed ring means and a second of said toothed sections engages said first toothed worm wheel.

12. A device according to claim 1, wherein said inertia masses, relative to said housing, are supported by means of needle bearings.

13. A device for balancing a rotating body which is mounted on a shaft, wherein the balancing is accomplished by means of rotating inertia masses whose center of gravity is adjustable relative to the body to be balanced, which comprises:
- a single switch shaft having a predetermined length and a longitudinal axis, said switch shaft containing worm means disposed at predetermined longitudinally spaced positions adjacent a first end of said switch shaft, each of said worm means having gear sectors disposed at preselected angles relative to said longitudinal axis of said switch shaft;
- a housing securely connected to the body to be balanced, said housing having a longitudinal bore therethrough for slidably and rotatably receiving at least that portion of said switch shaft containing said worm means, said housing further comprising a hollowed-out portion for receiving inertia masses and for defining an inner wall means of said housing;
- toothed ring means securely disposed on said inner wall means of said housing;
- first and second inertia masses disposed within said hollowed-out portion of said housing, each of said first and second masses having contained therein a corresponding transmission gear means, each of said transmission gear means cooperating with said toothed ring means and said gear sectors on said switch shaft worm means for adjusting the position of said masses relative to said housing in response to a longitudinal sliding displacement of said switch shaft relative to said housing and rotation of said housing relative to said switch shaft, each of said transmission gear means including
- a first worm shaft having a first toothed worm wheel which is in engagement with said gear sectors of a preselected one of said worm means on said switch shaft, and a second worm shaft having a second toothed worm wheel which is in motion transmitting engagement with said first worm shaft and with said toothed ring means on said inner wall means of said housing;
- and locking means for maintaining said switch shaft at a preselected longitudinal position relative to said housing.

* * * * *